United States Patent [19]

Simonson

[11] 4,351,126
[45] Sep. 28, 1982

[54] FOLDABLE GAFF HOOK

[76] Inventor: Theodore K. Simonson, 5 May Ct., West Hempstead, N.Y. 11552

[21] Appl. No.: 223,243

[22] Filed: Jan. 8, 1981

Related U.S. Application Data

[63] Continuation of Ser. No. 99,404, Dec. 3, 1979, abandoned.

[51] Int. Cl.³ .............................................. A01K 97/14
[52] U.S. Cl. ............................................ 43/5; 294/26
[58] Field of Search .................. 43/5, 6; 294/26, 53.5; 30/161, 160, 159; 30/155

[56] References Cited

U.S. PATENT DOCUMENTS

| 1,231,058 | 6/1917 | Panza | 30/161 |
| 1,451,607 | 4/1923 | Bates | 30/161 |
| 2,214,660 | 9/1940 | Darling | 294/26 |
| 2,461,941 | 2/1949 | Sutton | 30/161 |
| 2,496,822 | 2/1950 | Stoddard | 294/26 |
| 2,516,620 | 7/1950 | Darling | 294/26 |
| 2,570,688 | 10/1951 | Keegan | 294/26 |
| 2,725,253 | 11/1955 | Wallman | 294/26 |

FOREIGN PATENT DOCUMENTS

| 476784 | 9/1951 | Canada | 43/5 |
| 699098 | 11/1940 | Fed. Rep. of Germany | 294/53.5 |
| 152608 | 12/1955 | Sweden | 294/26 |
| 1212171 | 11/1970 | United Kingdom | 43/5 |

Primary Examiner—Nicholas P. Godici
Attorney, Agent, or Firm—James H. Chafin

[57] ABSTRACT

A foldable gaff hook which has a handle at one end of a shaft and a foldable curved hook member at the opposite end of the shaft. The hook is pivotally carried by a cam member which cooperates with a spring-loaded cam follower whereby the hook may be held in a fully open position exposing the point of the hook or in a fully closed position wherein the point of the hook is recessed in the shaft.

4 Claims, 7 Drawing Figures

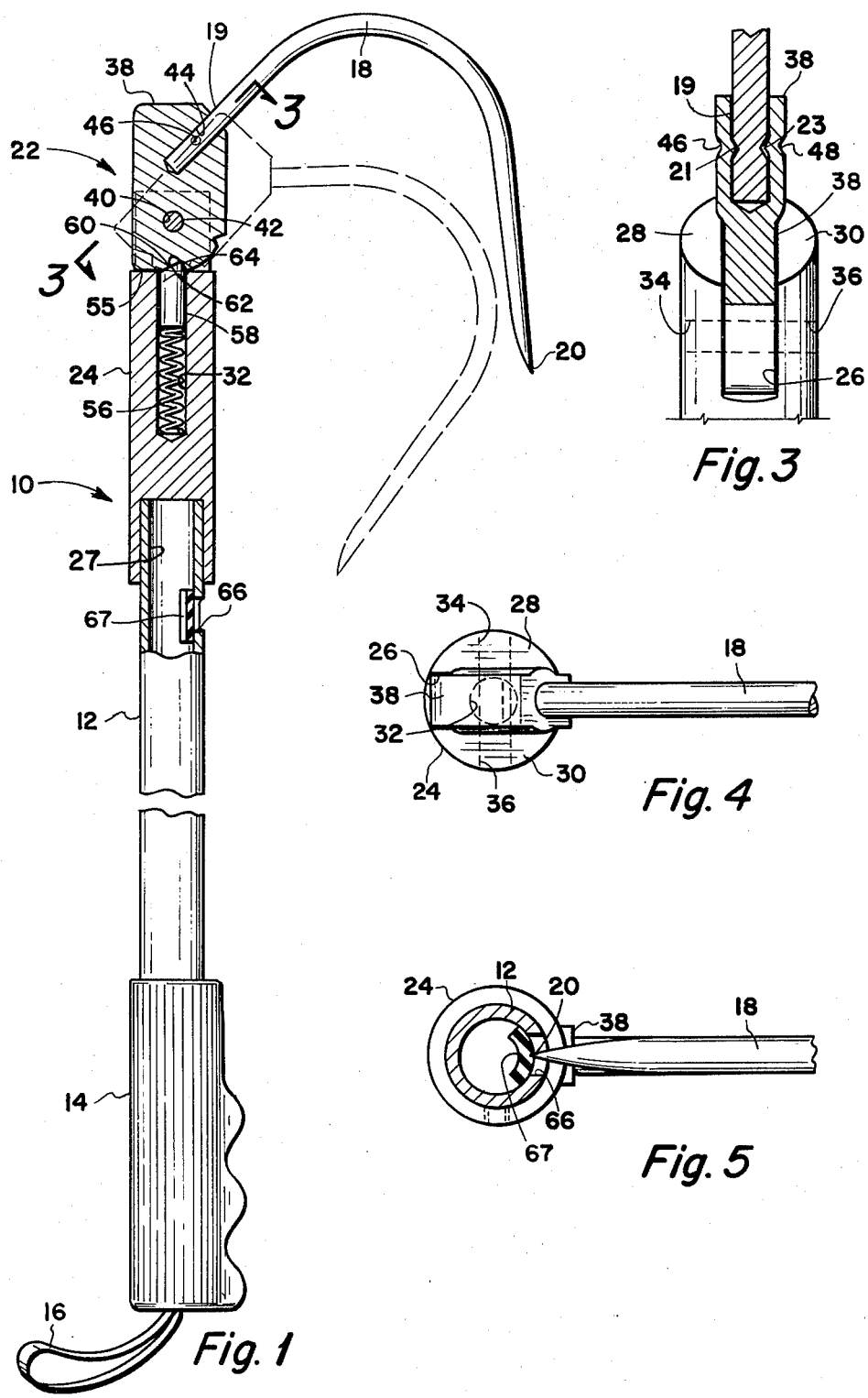

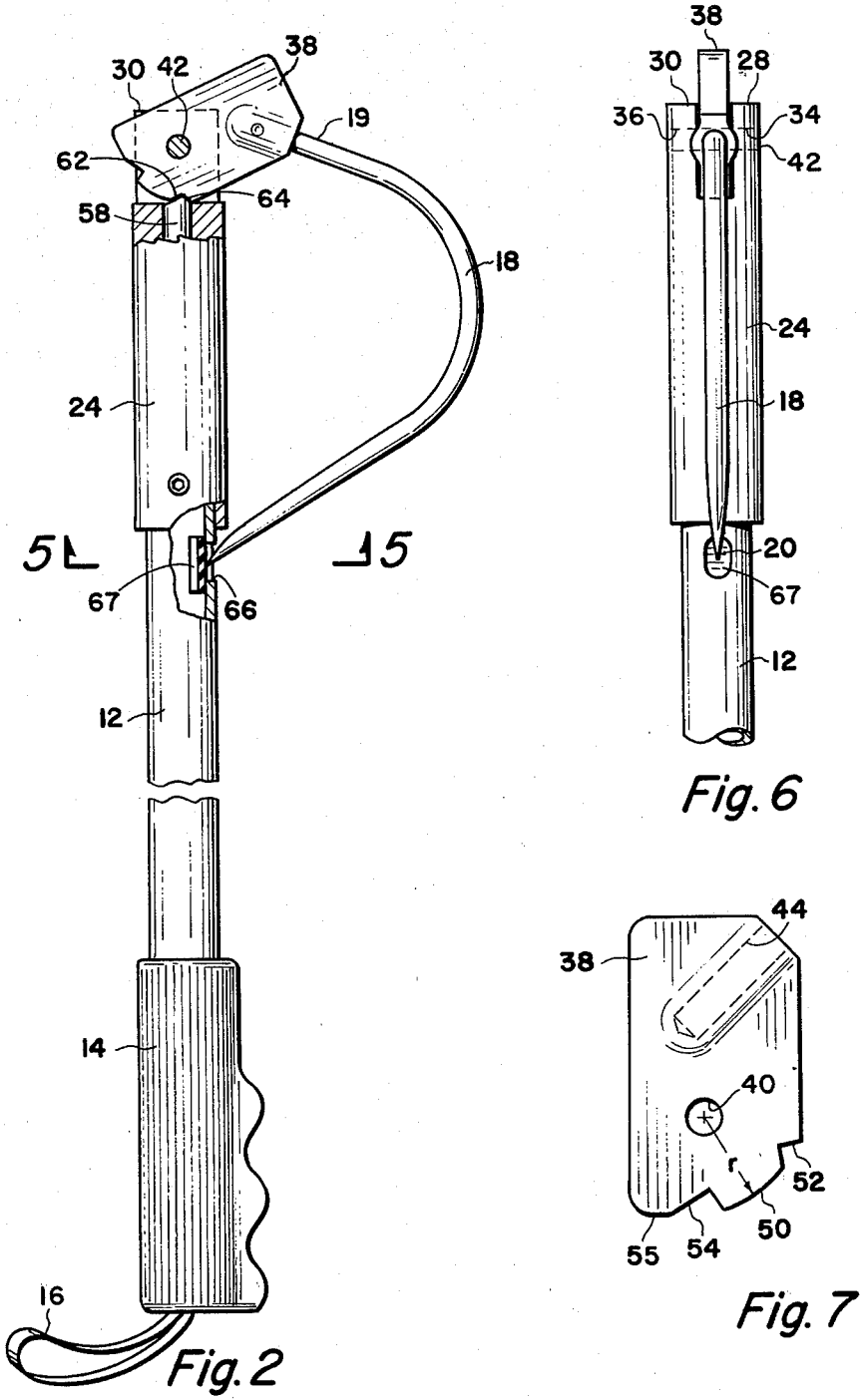

FOLDABLE GAFF HOOK

This is a continuation application of Ser. No. 099,404, filed Dec. 3, 1979 abandoned.

BACKGROUND OF THE INVENTION

1. Field of the Invention

The present invention relates to fishing tools and more particularly, but not by way of limitation, to a foldable gaff hook whereby the point is hidden when in a closed position for safety purposes.

2. History of the Prior Art

Gaff hooks have been historically used on fishing boats, at piers and by surf fishermen for loading and handling fish that have been caught on a line or in a net.

The hook usually consists of an elongated shaft having a handle at one end and a curved hook at the opposite end, the curved hook having an exposed sharpened point. This hook can be extremely dangerous and represents a hazard to fishermen, crewmen and bystanders when the hook is not being used. Thousands of fishermen, crewmen and bystanders are injured each year. Gaff hooks which are not being used are the primary cause of these injuries in that they are usually left lying around with the hook point exposed.

Some of the hooks are barbed which makes them even more dangerous and should the hook point penetrate a persons's flesh, past a barb, it often has to be surgically removed.

SUMMARY OF THE INVENTION

The present invention provides a foldable gaff hook with the safety feature of being able to recess the point of the hook into the shaft of the mechanism when not in use while maintaining the necessary strength requirements for the handling of large active fish.

The curved hook of the present invention is foldable so that the point of the hook may be sheathed in a recess in the shaft to prevent injury to personnel and also to prevent damage to the hook point itself.

The hook is pivotally mounted to the end of a shaft by means of a heavily constructed cam plate. The cam plate has a shaped cam surface which is in constant contact with a spring-loaded cam follower pin. The cam follower pin is reciprocally disposed in the end of the shaft.

Shaped notches are provided at each end of the cam surface for engagement with the cam follower. When the hook is folded or closed, the point is received in a protective recess in the shaft itself and the cam follower is positioned in a first of the notches which tends to hold the hook in a closed-for-safety position.

To open the hook in order to use the device, an opening force must be applied to the curved hook member to move the cam follower out of the first notch.

The hook may then be fully opened to a usable position wherein the cam engages the stop member to prevent further rotation and simultaneously, the cam follower engages the second notch which holds the hook in the open position while still providing the strength and rigidity required for hooking and handling large fish.

DESCRIPTION OF THE DRAWINGS

Other and further advantageous features of the present invention will hereinafter more fully appear in connection with a detailed description of the drawings in which:

FIG. 1 is a side elevational view, partially in section, of a foldable gaff hook embodying the present invention.

FIG. 2 is a side elevational view, again partially in section, of the foldable gaff hook of FIG. 1 with the hook in the second or closed position.

FIG. 3 is a sectional view of the hook of FIG. 1 taken along the broken lines 3—3 of FIG. 1.

FIG. 4 is plan view of the gaff of FIG. 1.

FIG. 5 is a bottom sectional view of the hook of FIG. 2 taken along the broken lines 5—5 of FIG. 2.

FIG. 6 is a partial elevational view of the hook of FIG. 2.

FIG. 7 is a detail view of the cam plate member of the invention.

DESCRIPTION OF THE PREFERRED EMBODIMENT

Referring to the drawings in detail, reference character 10 generally indicates a foldable gaff hook which comprises an elongated shaft 12 having a handle member 14 carried by one end thereof and is normally provided with a wrist tether strap 16 at the end of the handle 14.

The opposite end of the shaft 12 is provided with a curved hook member 18 having a pointed end 20, the opposite end of which comprises a straight portion 19, which is pivotally attached to the end of the shaft 12 by means of a pivotal attachment assembly generally indicated by reference character 22. The straight end portion 19 of the hook is provided with oppositely disposed aligned recesses 21 and 23, the alignment of said recesses 21 and 23 being perpendicular to the plane of the curved hook.

The assembly 22 consists of an elongated collar member 24 which is provided with a bore 26 at one end thereof for attachment to the end of the shaft 12 and which serves as an extension of the end of the shaft 12. The shaft 12 could include the collar member 24 as an integral part thereof. However, in the interest of saving weight and expense, the shaft 12 may be made of tubular metal while the collar member 24 is typically of solid material machined or otherwise formed in a manner that will be hereinafter set forth.

The outer end of the collar member 24 is provided with a transverse groove 26 which leaves outwardly extending ear members 28 and 30.

The base of the groove 26 is provided with an elongated centrally disposed longitudinal bore 32 for a purpose that will be hereinafter set forth. The ear members 28 and 30 further comprises a pair of aligned transverse bores 34 and 36 respectively.

The pivot attachment assembly 22 comprises a substantially flat cam plate 38. The cam plate 38 is provided with a transverse bore 40 for pivotally attaching to the aligned bores 34 and 36 of the collar member by means of a suitable pivot pin 42.

The cam plate 38 further comprises an elongated bore 44 extending therein for receiving the straight end portion 19 of the hook 18.

After the straight end portion 19 of the hook 18 is inserted in the bore 44, a punch or other suitable tool (not shown) is used to strike a pair of oppositely disposed dimples 46 in the opposite sides of the cam plate 38 and in alignment with the recesses 21 and 23 of the hook member.

The cam plate 38 is further provided with a cam surface 50 which forms an arc of a circle having radius r, the distance r being slightly greater than the distance from the center of the pivot pin 42 inwardly to the base of the transverse groove 26 of the collar.

At one end of the cam surface 50, there is a substantially right angled notch 52. At the opposite end of the cam surface 50 is a second substantially right angled notch 54 terminating in a flat end surface 55.

An elongated compression spring 56, is disposed within the longitudinal bore 32 of the collar. A cam follower member 58 is slidably disposed within the aperture 32 with one end thereof being in engagement with the outer end of the spring member 56. The outer end of the cam follower 58 is provided with a protrusion 60 made up of two right angle planes 62 and 64, the planes 62 and 64 being made by truncating the pin. The protrusion 60 is shaped and sized to be receivable in the notches 52 and 54 of the cam member 58. The angle between the plane 62 and the longitudinal axis of the follower 58 is greater than the angle between the plane 64 and said axis, the angle between the two planes 62 and 64 being 90°.

An oval shaped aperture 66 is provided in the shaft member 12 such that the aperture 66 lies in the plane containing the hook member 18, the aperture 66 being spaced the same distance from the pivot pin 42 as the point 20 of the hook member. The aperture 66 is blocked by a rubber pad 67 which is secured to the inside of the tube 12 to prevent water from entering the tube.

Referring to FIG. 1 of the drawings it can be seen that when the hook member 18 is in its fully open position, the flat surface 55 of the cam member 38 is in engagement with the base of the transverse groove 26 which will prevent further counter-clockwise rotation of the hook with respect to the shaft. Simultaneously, the cam follower protrusion 60 of the cam follower is in engagement with the right angle notch 54 of the cam member 38.

In the position shown in FIG. 1, the hook is ready for use in hooking and handling large fish.

When the gaff hook is not in use, the hook member 18 may be rapped lightly at the end so that the follower plane 64 bears against the notch 54 thereby dislodging the protrusion 60 from the notch 54. The hook can then be rotated in a clockwise direction as shown in FIG. 1 wherein the protrusion 60 rides along the cam surface 50. When the hook is fully folded or in a closed position, the point 20 thereof will extend into the sheath or recess 66 in the shaft member 12 against the pad 67. At this point, the protrusion 60 of the cam follower 58 is urged into engagement with the notch 52 as shown in FIG. 2.

In this position, the gaff hook may be handled in the vicinity of personnel without fear of inadvertently causing injury. Further, the hook 18 will tend to stay in this position until it is manually opened again for use. In order to open the hook, a force must be exerted in a counter-clockwise direction as shown in FIG. 1 so that the cam follower plate 62 bears against the notch 52 in order to overcome the pressure of the spring 56 to allow the cam follower to disengage from the notch 52 and ride along the cam surface 50. It can be seen that since the angle between the plane 62 and the longitudinal axis of the cam follower is greater than that of the plane 64, the hook may be more easily moved from a closed position than from an open position.

From the foregoing it is apparent that the present invention provides a gaff hook wherein the sharp point thereof may be stowed within the handle when it is not in use. In the folded position, the gaff may be safely carried on the belt of a surf fisherman and may be used as a club to aid in landing blue fish and the like.

Further, it is seen that when the hook is in use or in the fully opened position it may be sufficiently rigid to handle large fish without fear of inadvertent collapse.

Whereas the present invention has been described in particular relation to the drawings attached hereto, other and further modifications apart from those shown or suggested herein may be made within the spirit and scope of the invention.

What is claimed is:

1. A foldable gaff comprising
an elongated shaft having a handle at a first end thereof;
a cam plate member pivotally secured to a second end of the shaft, a curved hook secured to the cam plate member, an arcuate shaped cam surface carried by the cam plate member and having first and second spaced notches therein;
an elongated longitudinal recess in the second end of the shaft, an elongated cam follower reciprocally carried in the recess, a compression spring carried in the recess for urging the cam follower outwardly against the cam surface of the cam plate member, said cam follower comprising a shaped protrusion at the outer end thereof for engaging the cam surface and complimentary with the spaced notches therein, said protrusion comprising a pair of intersecting plane surfaces, the planes defined by said plane surfaces being parallel to the pivotal axis of the cam plate member wherein in a fully open position said cam follower protrusion is seated in the first notch whereupon pressure applied to the hook toward a closed position causes the cam surface adjacent the first notch to press against one of the plane surfaces of the protrusion forcing said cam follower to retract within said recess to enable movement of the hook to a folded position wherein said cam follower protrusion is seated in the second notch, whereby an opening force applied to the hook causes the cam surface adjacent said second notch to bear against the second plane surface of the protrusion again causing the cam follower to retract within said recess.

2. A foldable gaff as set forth in claim 1 wherein said shaft is hollow and including an aperture in said shaft to receive and protect the pointed end of the hook when the hook is in a closed position and including seal means secured to the aperture to seal the inside of the shaft.

3. A foldable gaff as set forth in claim 1 wherein the intersecting plane surfaces of the cam follower protrusion intersect at substantially a right angle wherein the first plane surface is at an angle with respect to the longitudinal axis of the cam follower greater than the angle of the second plane surface resulting in less force being required to move the hook out of the closed position than out of the open position.

4. A foldable gaff comprising
an elongated shaft having a handle at a first end thereof;
a cam plate member pivotally secured to the second end of the shaft, a curved hook secured to the cam plate member, an arcuate cam surface carried by the cam plate member, first and second spaced right angle notches provided at each end of said cam surface, each said angle notch comprising a pair of intersecting surfaces, each said surface terminating at the cam surface;

an elongated longitudinal recess in the second end of the shaft, an elongated cam follower reciprocally carried in the recess, a compression spring carried in the recess for urging the cam follower outwardly against the cam surface of the cam plate member;

wherein the cam follower comprises a shaped protrusion at the outer end thereof for engaging the cam surface and being complimentary with the notches therein, the protrusion comprising a pair of intersecting right angle plane surfaces, the first plane surface being at an angle with respect to the longitudinal axis of the cam follower greater than the angle of the second plane surface whereby said first plane surface bears against the second notch when moving the hook out of the folded position and whereby said second plane surface bears against the first notch when moving the hook out of the open position, less force being required to move the hook out of the closed position than out of the open position.

* * * * *